US012594711B2

(12) United States Patent　　(10) Patent No.:　　US 12,594,711 B2
　　Blasius　　　　　　　　　　　　(45) Date of Patent:　　Apr. 7, 2026

(54) RECIPROCATING INJECTION UNIT

(71) Applicant: Uniloy, Inc., Tecumseh, MI (US)

(72) Inventor: Chase D. Blasius, Tecumseh, MI (US)

(73) Assignee: Uniloy, Inc., Tecumseh, MI (US)

( * ) Notice: Subject to any disclaimer, the term of this patent is extended or adjusted under 35 U.S.C. 154(b) by 733 days.

(21) Appl. No.: 17/948,856

(22) Filed: Sep. 20, 2022

(65) Prior Publication Data

US 2023/0090657 A1　　Mar. 23, 2023

Related U.S. Application Data

(60) Provisional application No. 63/246,075, filed on Sep. 20, 2021.

(51) Int. Cl.
　　*B29C 48/25*　　(2019.01)
　　*B29C 49/04*　　(2006.01)
　　*B29C 49/28*　　(2006.01)
　　*B29C 49/42*　　(2006.01)
(52) U.S. Cl.
　　CPC ...... *B29C 49/42362* (2022.05); *B29C 48/252* (2019.02); *B29C 49/04* (2013.01); *B29C 49/28008* (2022.05); *B29C 49/42374* (2022.05)
(58) Field of Classification Search
　　CPC .............................................. B29C 49/42362
　　See application file for complete search history.

(56) References Cited

U.S. PATENT DOCUMENTS

| | | | |
|---|---|---|---|
| 4,693,676 | A | 9/1987 | Inaba |
| 4,962,345 | A | 10/1990 | Crafts |
| 6,406,286 | B1 | 6/2002 | Hehl |
| 6,443,722 | B1 | 9/2002 | Castelli |
| 7,234,928 | B2 | 6/2007 | Emoto |
| 7,901,127 | B2 | 3/2011 | Knauff |
| 7,967,590 | B2 | 6/2011 | Grunitz |
| 8,075,817 | B2 | 12/2011 | Yamada |
| 9,108,352 | B2 | 8/2015 | Takeuchi |
| 10,759,100 | B2 | 9/2020 | Ono |
| 2019/0084204 | A1* | 3/2019 | Ono ...................... B29C 45/661 |

FOREIGN PATENT DOCUMENTS

| | | |
|---|---|---|
| DE | 19605747 A1 | 8/1997 |
| EP | 3173209 A1 | 5/2017 |
| JP | 3256715 A | 11/1991 |
| JP | 03256715 B2 | 2/2002 |

* cited by examiner

*Primary Examiner* — Armand Melendez
(74) *Attorney, Agent, or Firm* — Barnes & Thornburg LLP

(57)　　　　　　ABSTRACT

A reciprocating blow molding unit includes an extruder screw foundation and an extrusion unit coupled to the extruder screw foundation. The extruder screw foundation includes a screw housing formed to include an interior cavity configured to receive polymeric material. The extrusion unit includes an extruder screw arranged to lie at least partially within the interior cavity and is configured to rotate about a longitudinal rotation axis to advance the polymeric material through the interior cavity.

8 Claims, 5 Drawing Sheets

RECIPROCATING INJECTION UNIT

PRIORITY CLAIM

This application claims priority under 35 U.S.C. § 119(e) to U.S. Provisional Application Ser. No. 63/246,075, filed Sep. 20, 2021, which is expressly incorporated by reference herein.

BACKGROUND

The present disclosure relates to devices for extruding plastic material, and particularly to blow molding devices. More particularly, the present disclosure relates to a reciprocating blow molding device.

SUMMARY

According to the present disclosure, a reciprocating blow molding unit includes an extruder screw foundation and an extrusion unit. The extruder screw foundation includes a screw housing formed to include an interior cavity configured to receive polymeric material. The extrusion unit includes an extruder screw arranged to lie at least partially within the interior cavity and a first motor that is configured to rotate the extruder screw about a longitudinal rotation axis to advance the polymeric material through the interior cavity.

In illustrative embodiments, the reciprocating blow molding unit further includes a translation unit configured to reciprocate the extruder screw. The translation unit includes a screw translator and a second motor configured to drive movement of the screw translator to cause the extrusion unit and the translation unit to translate in unison relative to the extruder screw foundation along the longitudinal rotation axis. In the illustrative embodiment, the first and second motors are electric motors.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a reciprocating blow molding unit including an extruder screw foundation, an extrusion unit including an extruder screw and a first motor configured to drive rotation of the extruder screw about a rotation axis, and a translation unit including a screw translator and a second motor configured to drive translation of the extruder screw back and forth along the rotation axis;

DETAILED DESCRIPTION

Figure 1:
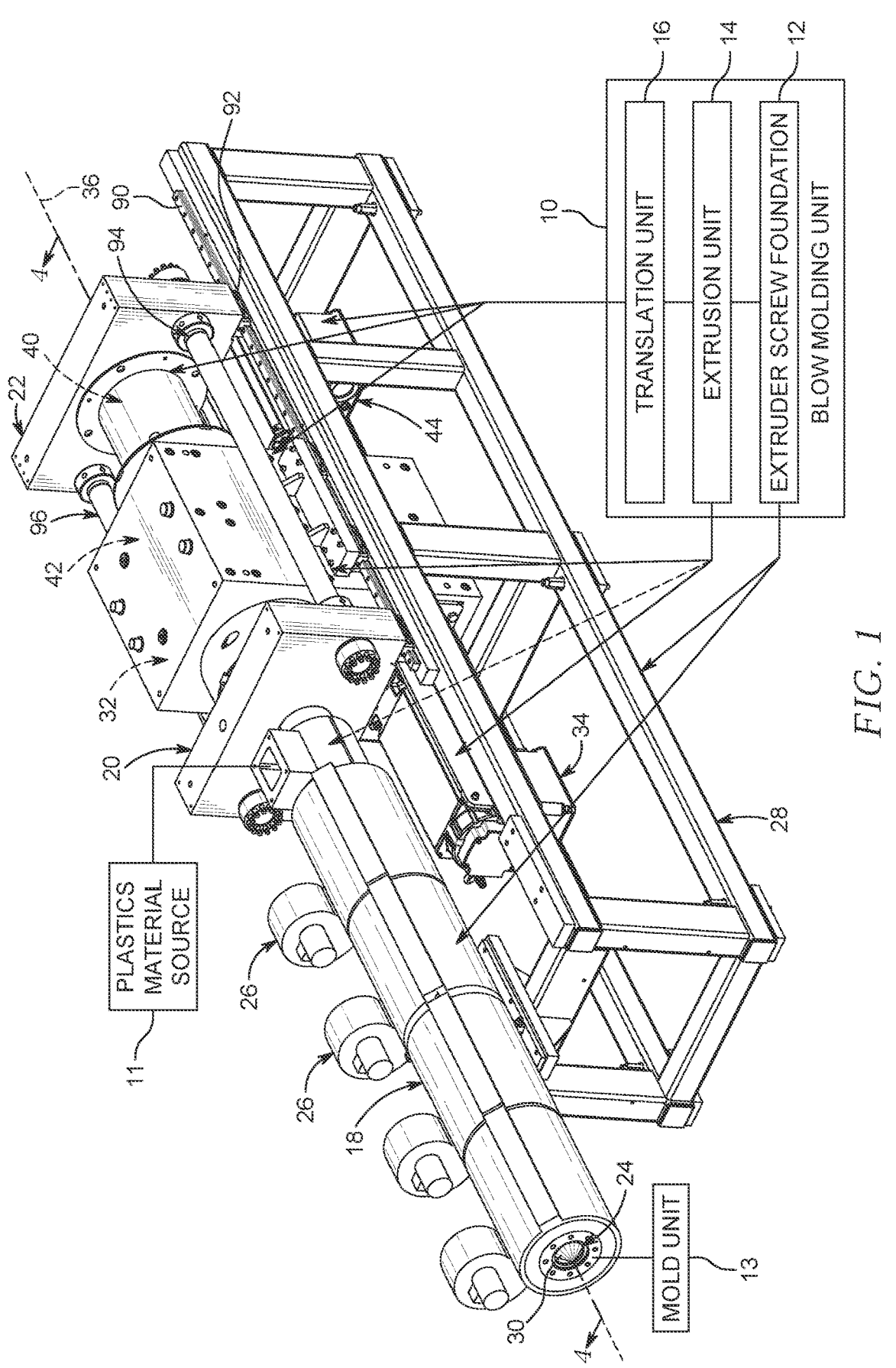
Figure 7:
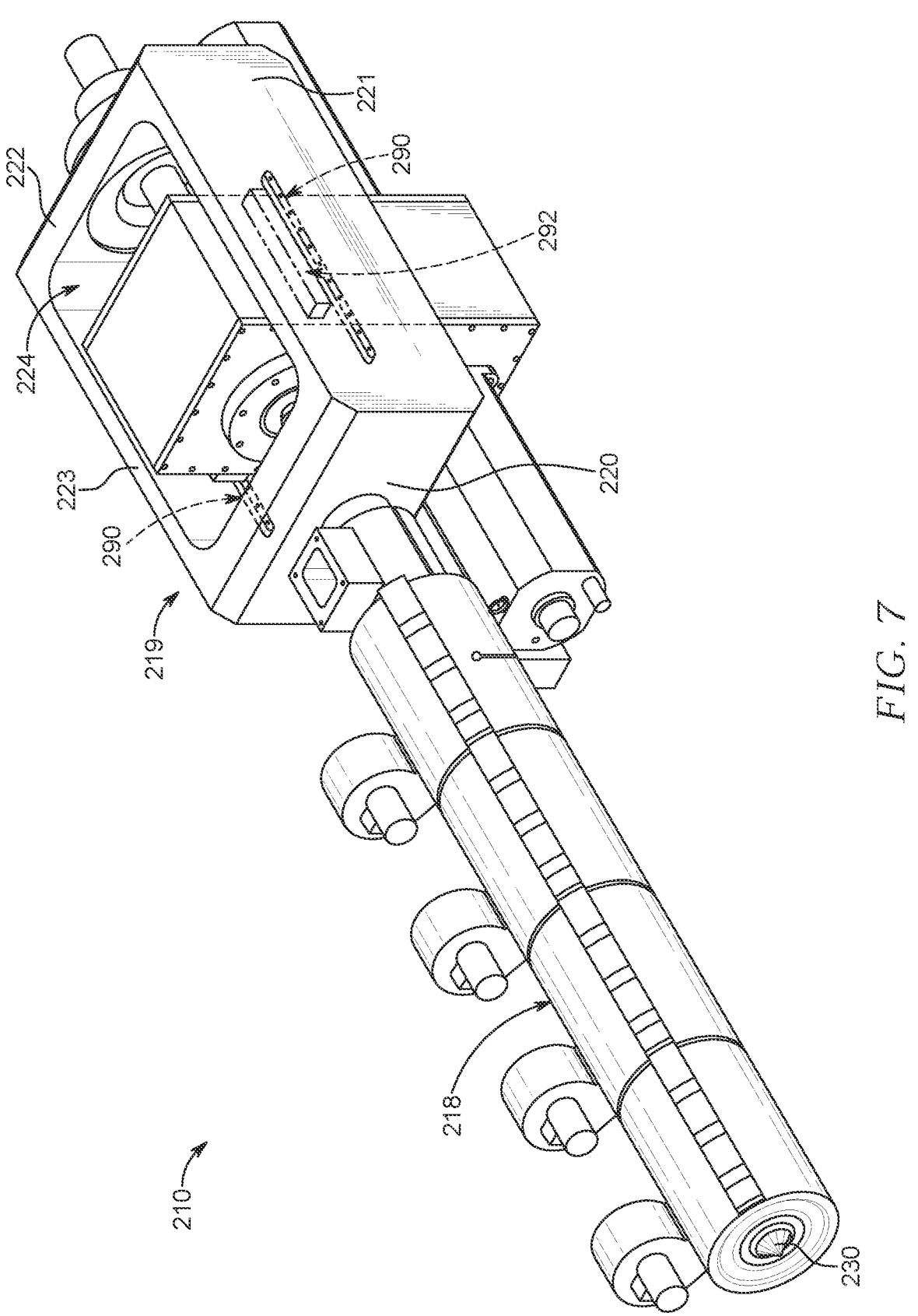
FIG. 7 is a perspective view of another embodiment of a reciprocating blow molding unit, in accordance with the present disclosure.

A reciprocating blow molding unit 10, in accordance with the present disclosure, is shown in FIG. 1. The reciprocating blow molding unit 10 includes an extruder screw foundation 12 and an extrusion unit 14. The extruder screw foundation 12 is configured to support the extrusion unit 14 above ground and is coupled to a plastics material source 11, such as a hopper, to receive a supply of plastics material. The extrusion unit 14 is configured to process the plastics material and extrude the processed plastics material downstream toward a mold unit 13 which forms one or more plastic articles from the processed plastics material. Another embodiment of a similar reciprocating blow molding unit 210 is shown in FIG. 7.

The extruder screw foundation 12 includes a screw housing 18, a first fixed support 20, and a second fixed support 22 as shown in FIG. 1. The screw housing 18 is formed to include an interior cavity 24 that is configured to receive plastic or polymeric material from the plastics material source 11. The first fixed support 20 is coupled to a rear end of the screw housing 18. The second fixed support 22 is spaced apart from the first fixed support 20 and from the rear end of the screw housing 18. In some embodiments, the extruder screw foundation 12 further includes a plurality of heaters 26 configured to heat the polymeric material in the interior cavity 24 and a support frame 28 configured to support the screw housing 18 and the first and second fixed mounts 20, 22 above ground.

The extrusion unit 14 includes an extruder screw 30 arranged to lie at least partially within the interior cavity 24, a first gear unit 32, and a first motor 34 as shown in FIGS. 1-5. The extruder screw 30 is configured to advance the polymeric material through the interior cavity 24 to the mold unit 13. The first motor 34 is configured to cause rotation of the extruder screw 30 about a longitudinal rotation axis 36. The first gear unit 32 is configured to transfer motion of the first motor 34 to the extruder screw 30. In some embodiments, the first motor 34 may be coupled directly to the extruder screw 30 to cause direct rotation thereof such that the first gear unit 32 may be omitted.

Figure 4:
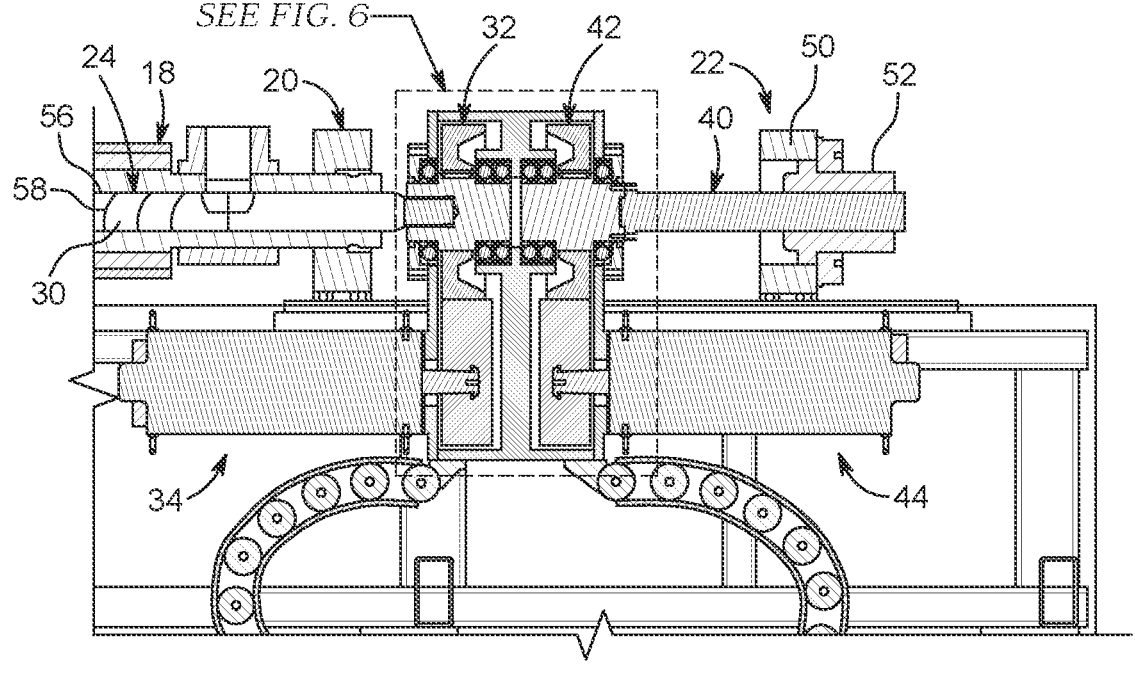
FIG. 4 is a cross section of a portion of the blow molding unit taken along line 4-4 in FIG. 1 showing the extrusion unit and the translation unit in the extended, forward position.
Figure 5:
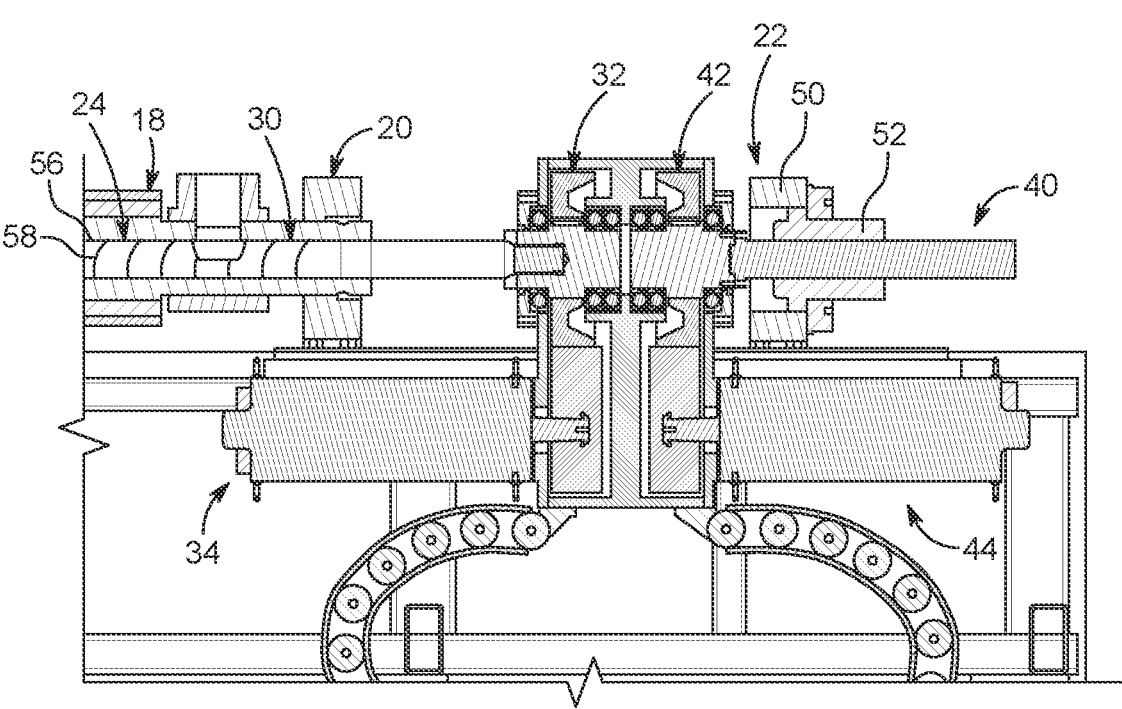
FIG. 5 is a cross section of a portion of the blow molding unit similar to FIG. 4 showing the extrusion unit and the translation unit in the retracted, rearward position.

The extruder screw 30 includes a screw shaft 56 having a first end and an opposite, second end and a plurality of threads 58 coupled to the screw shaft 56 and arranged to extend away from the first end and toward the second end as shown in FIGS. 4 and 5. The screw shaft 56 is fixed to one of the first gear unit 32 and the first motor 34. The plurality of threads 58 are arranged to lie in the interior cavity 24 and advance the polymeric material through the interior cavity 24 toward the second end of the screw shaft 56 as the extruder screw 30 is rotated about the rotation axis 36.

Figure 2:
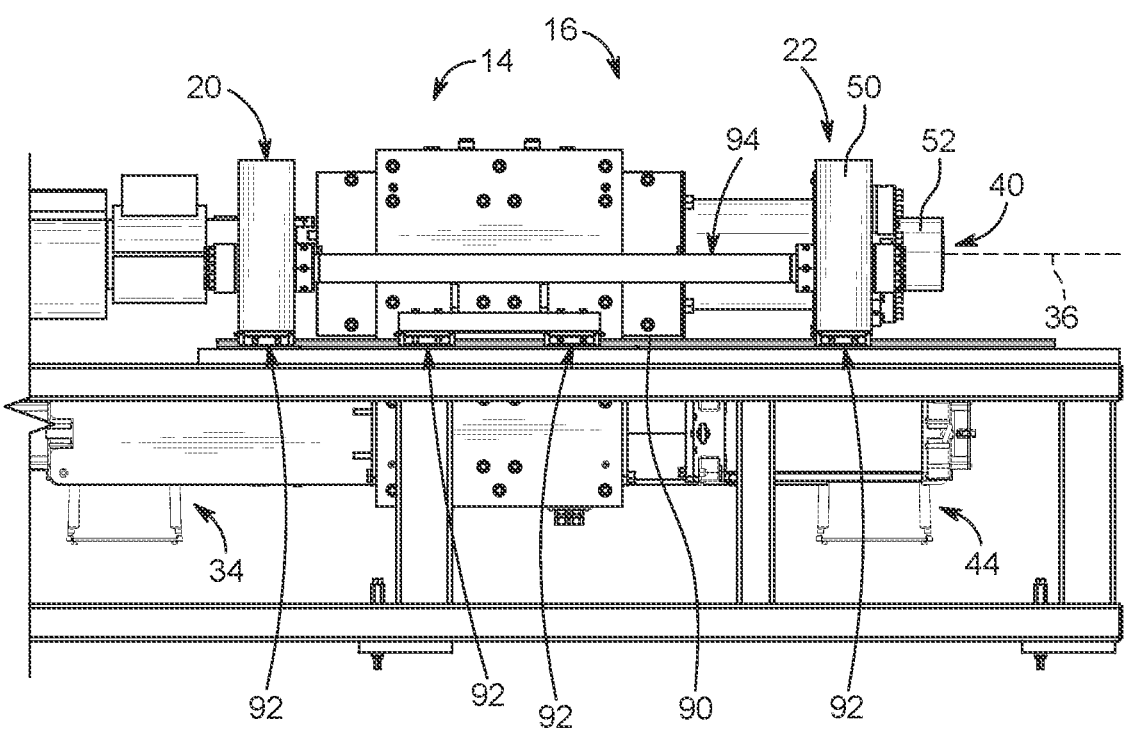
FIG. 2 is a side elevation view of a portion of the blow molding unit from FIG. 1 showing the extrusion unit and the translation unit in an extended, forward position.
Figure 3:
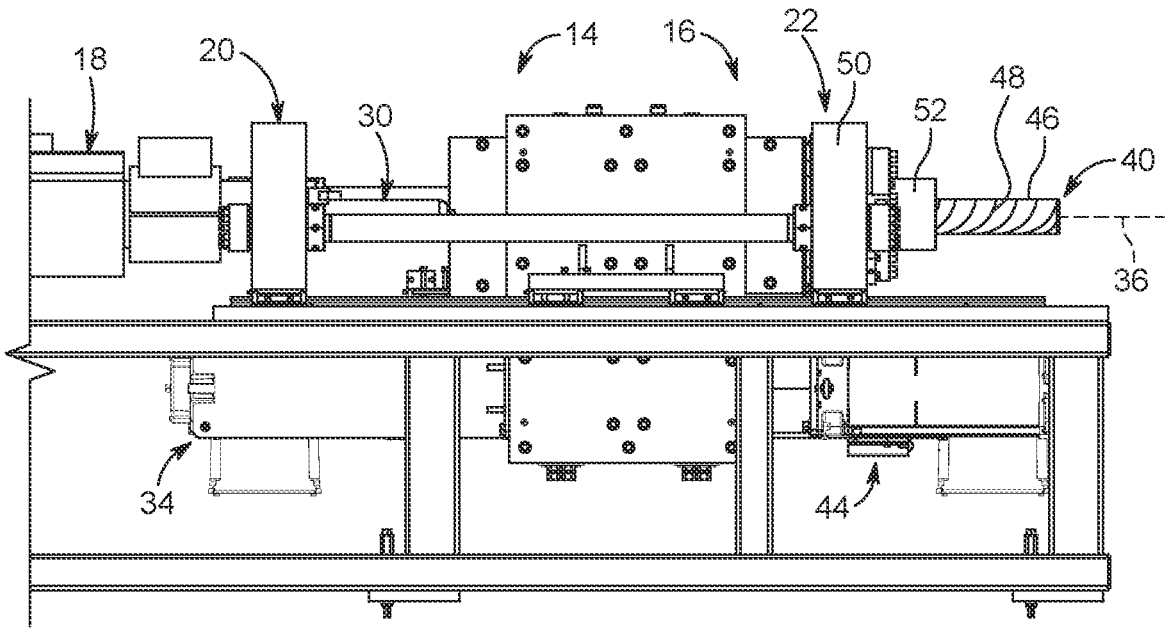
FIG. 3 is a side elevation view of a portion of the blow molding unit from FIG. 1 showing the extrusion unit and the translation unit in a retracted, rearward position.

In illustrative embodiments, the reciprocating blow molding unit 10 further includes a translation unit 16 configured to move the extruder screw 30 between an extended, forward position, as shown in FIGS. 2 and 4, and a retracted, rearward position, as shown in FIGS. 3 and 5. The translation unit 16 includes a screw translator 40 coupled to the second fixed support 22, a second gear unit 42 coupled to the screw translator 40, and a second motor 44. The second motor 44 is configured to drive movement of the second gear unit 42 to cause rotation of the screw translator 40 about the longitudinal rotation axis 36 so that the extruder screw 30 translates relative to the extruder screw foundation 12 along the longitudinal rotation axis 36. In some embodiments, the second motor 44 may be coupled directly to the screw translator 40 to cause direct rotation thereof such that the second gear unit 42 may be omitted.

The translation unit 16 is configured to move the entire extrusion unit 14 and the entire translation unit 16 relative to the extruder screw foundation 12 between the extended and retracted positions as shown in FIGS. 2-5. In the extended position, the extrusion screw 30 is fully inserted into the screw housing 18. In the retracted position, the extrusion screw 30 is partially removed from the screw housing 18. Translation of the extruder screw 30 from the retracted position to the extended position by the translation unit 16 forces processed polymeric material from the extruder screw housing 18 to the mold unit 13. The first and second gear units 32, 42 are closer to the first fixed support 20 in the extended position than they are in the retracted position.

The screw translator 40 is illustratively embodied as a translator screw 40 and includes a translator shaft 46 and a plurality of external threads 48 coupled to the translator shaft 46 as shown in FIGS. 2-5. The second fixed mount 22 includes a mount frame 50 and a threaded collar 52 coupled to the mount frame 50. The threaded collar 52 is configured to mesh with the plurality of external threads 48 of the translator screw 40. The translator screw 40 is configured to rotate in a first direction to cause the extrusion unit 14 and the translation unit 16 to move away from the first fixed mount 20 and toward an the second fixed mount 22 to change the extruder screw 30 from the extended position to the retracted position. The translator screw 40 is configured to rotate in an opposite, second direction to cause the extrusion unit 14 and the translation unit 16 to move away from the second fixed mount 22 and toward the first fixed mount 20 to change the extruder screw 30 from the retracted position to the extended position.

Figure 6:
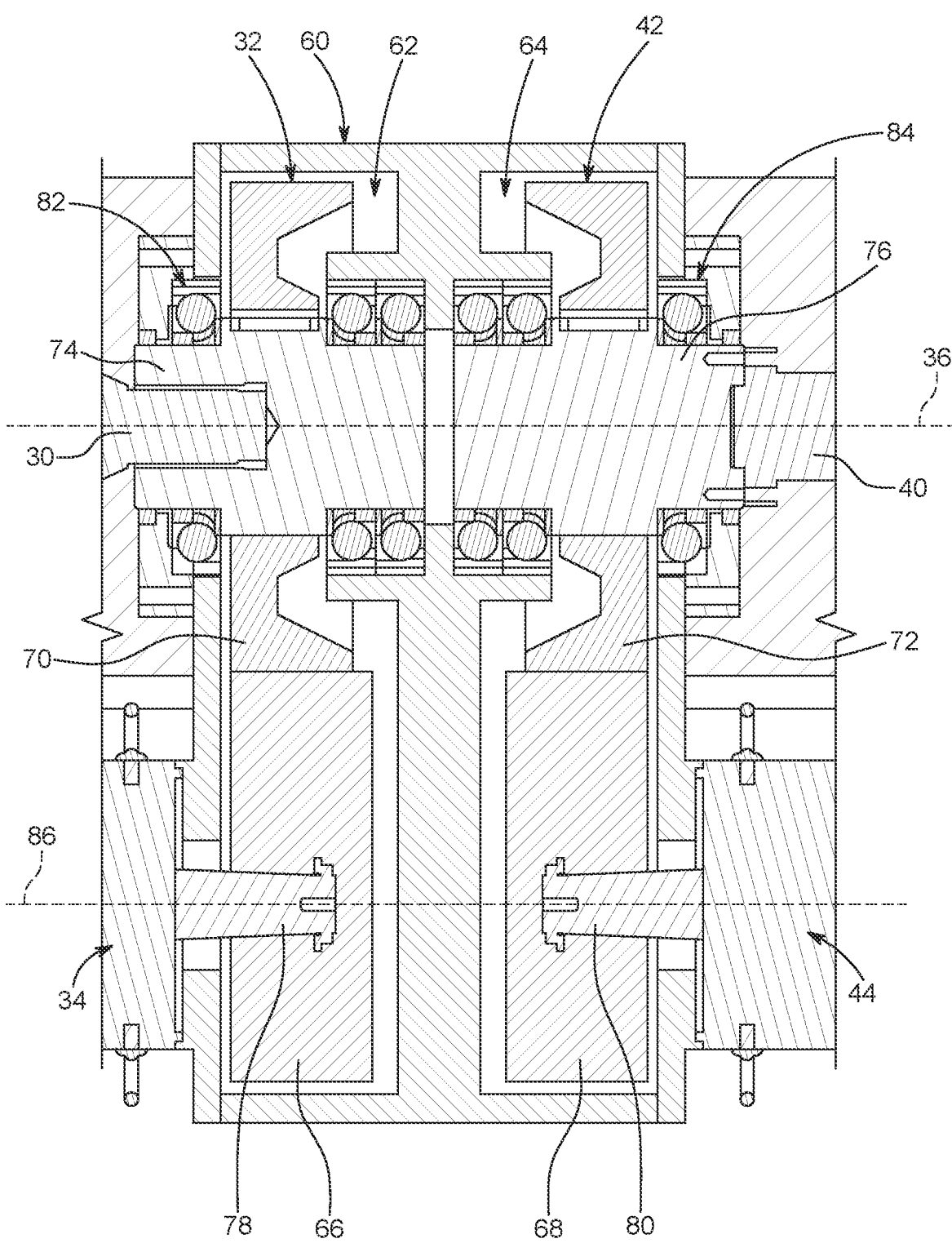
FIG. 6 is an enlarged portion of FIG. 4 showing a first gear set included in the extrusion unit and a second gear set included in the translation unit.

The first gear unit 32 and the second gear unit 42 are each included in a common gearbox 60 that is formed to include a first interior subspace 62 housing the first gear unit 32 and a second interior subspace 64 housing the second gear unit 42 as shown in FIG. 6. Both gear units 32, 42 may include a drive gear 66, 68, one or more intermediate gears 70, 72, and a screw mount 74, 76. Each drive gear 66, 68 is coupled to a respective drive shaft 78, 80 of each motor 34, 44. The intermediate gear(s) 70, 72 are coupled to each respective drive gear 66, 68 and to each respective screw mount 74, 76. Each screw mount 74, 76 is coupled to an end of a respective one of the extruder screw 30 and the translator screw 40. The drive gears 66, 68 and intermediate gears 70, 72 may be any suitable gear such as a spur gear, a helical gear, a bevel gear, etc. Ball bearings 82, 84 are arranged to lie between the screw mounts 74, 76 and the gearbox 60 to allow rotation of the screw mounts 74, 76 relative to the gearbox 60.

In the illustrative embodiment, both motors 34, 44 are electric motors. The motors 34, 44 may be alternating current (AC), direct current (DC), or electrically controlled motors (EC). The motors 34, 44 may also be brushed or brushless. The first motor 34 is coupled to a first side of the common gearbox 60 while the second motor 44 is coupled to an opposite, second side of the common gearbox 60 as shown in FIG. 6. The first drive shaft 78 of the first motor 34 extends toward the first and second gear units 32, 42 and the second motor 44. The second drive shaft 80 of the second motor 44 extends toward the first and second gear units 32, 42 and the first motor 34. The first drive shaft 78 and the second drive shaft 80 rotate about a common drive-shaft axis 86 which is parallel to and spaced apart from the longitudinal rotation axis 36. In some embodiments, the motors 34, 44 may be offset from one another or coupled to the same side of the gearbox as one another.

The support frame 28 includes a plurality of guide rails 90 and a plurality of guide-rail mounts 92 coupled to the common gearbox 60 to allow sliding movement of the extrusion unit 14 and the translation unit 16 relative to the support frame 28. The first and second fixed mounts 20, 22 are also coupled removably to the plurality of guide rails 90 so that the extruder screw foundation 12, the extrusion unit 14, and the translation unit 16 can be repositioned along the plurality of guide rails 90 in unison with one another. The extruder screw foundation 12 further includes tie bars 94, 96 that extend between and interconnect the first fixed mount 20 and the second fixed mount 22. The tie bars 94, 96 block movement of the mounts 20, 22 toward or away from one another as the translation unit 16 drives the translator screw 40. Thus, only the extrusion unit 12 and the translation unit 16 move during operation of blow molding unit 10.

In some embodiments, the extruder foundation 12, the extrusion unit 14, and the translation unit 16 are free to move along guide rails 90 during operation and for maintenance. For example, mounting the extruder screw foundation 12, the extrusion unit 14, and the translation unit 16 to the support frame 28 on guide rails 90 accommodates thermal expansion of the screw housing 18 relative to support frame 28 when the extruder 10 is brought up to high temperatures. This may also provide compliance within the unit to allow for stretch of the screw housing 18, injection tie bars 94, 96, and a nozzle of the extruder housing 18 during the extrusion process. This also allows the extruder screw foundation 12, the extrusion unit 14, and the translation unit 16 to be moved towards a rear of the support frame 28 for maintenance, screw replacement, and mold change over/replacement.

Another embodiment of a reciprocating blow molding unit 210 is shown in FIG. 7. The reciprocating blow molding unit 210 is similar to reciprocating blow molding unit 10 and includes an extruder screw foundation 212, an extrusion unit 214, and a translation unit 216. The extruder screw foundation 212 includes a screw housing 218 and a housing mount 219 having four side walls 220, 221, 222, 223. The screw housing 218 houses an extruder screw 230. The housing mount 219 mounts the extrusion unit 214 and the translation unit 216 relative to the screw housing 218. The four side walls 220, 221, 222, 223 of the housing mount 219 provide an interior space 224 as shown in FIG. 7.

The extrusion unit 214 includes the extruder screw 230, a first gear set 232, and a first motor 234 similarly to blow molding unit 10. The translation unit 216 includes a translator screw 240, a second gear set 242, and a second motor 244 similarly to blow molding unit 10. The first and second gear sets 232, 242 are arranged to lie at least partially in the interior space 224 and travel between walls 220, 222 in response to actuation of the translator screw 240 by the second motor 244.

Guide rails 290 are mounted on interior surfaces of walls 221, 223. Guide rail mounts 292 are mounted to a common gearbox 260 housing both gear sets 232, 242 and engage the guide rails 290 to allow for sliding movement of the extruder unit 214 and the translation unit 216 relative to the housing mount 219.

In some embodiments, an electric reciprocating injection blow molding machine 10 is shown in FIG. 1. The blow molding machine 10 includes components that cause rotation and reciprocation of an extruder screw 30. The blow molding machine 10 also has a heated barrel 18 housing the screw 30. The screw 30 both rotates and reciprocates within the barrel 18. Plastic pellets are fed into a hopper and are moved into the heated barrel 18 with the extruder screw 30. When it is time to injection mold an article, the extruder screw 30 is moved linearly (it reciprocates) to inject molten plastic material into mold plates 13.

In some embodiments, the blow molding machine 10 further includes a gearbox 60 and a plurality of internal gears 32, 42 that rotate the extruder screw 30 and a translator screw 40 to move back and forth for the reciprocal motion of the extruder screw 18. Two electric motors 34, 44 are coupled to the gearbox 60. The motor 34 on the left drives a first gear set 32 that rotates the extruder screw 18. The motor 44 on the right drives a second gear set 42 that rotates a shaft 40 that is threaded inside a collar 52. This arrangement allows the gearbox 60 to be pushed and pulled with respect to endplates 20, 22. In other blow molding machines the screw may be reciprocated hydraulically but the arrangement according to the present disclosure allows the use of the electric motors 34, 44 and a combined gearbox 60 that allows both rotation and reciprocation of the screw 30 to be accomplished in one unit. The present disclosure accomplishes translation without any hydraulic actuators that cause translation of the extruder screw 30.

The invention claimed is:

1. A reciprocating blow molding unit comprising:

an extruder screw foundation including a screw housing formed to include an interior cavity configured to receive polymeric material, a first fixed support coupled to a rear end of the screw housing, and a second fixed support spaced apart from the first fixed support and from the rear end of the screw housing, an extrusion unit including an extruder screw arranged to lie at least partially within the interior cavity and including a screw shaft having a first end and an opposite, second end and a plurality of threads coupled to the screw shaft and arranged to extend away from the first end and toward the second end, a first gear unit coupled to the first end of the screw shaft, and a first motor coupled the first gear unit and configured to drive movement of the first gear unit to cause rotation of the extruder screw about a longitudinal rotation axis so that the plurality of threads advance the polymeric material through the interior cavity toward the second end of the screw shaft, and a translation unit including a translator screw coupled to the second fixed support, a second gear unit coupled to the translator screw, and a second motor configured to drive movement of the second gear unit to cause rotation of the translator screw about the longitudinal rotation axis so that the extrusion unit translates relative to the extruder screw foundation along the longitudinal rotation axis, wherein the first gear unit and the second gear unit are each included in a common gearbox that is formed to include a first interior subspace housing the first gear unit and a second interior subspace housing the second gear unit, and wherein the translator screw is configured to rotate in a first direction to cause the extrusion unit, the translation unit, and the common gearbox to move away from the first fixed mount and toward the second fixed mount and the translator screw is configured to rotate in an opposite, second direction to cause the extrusion unit, the translation unit, and the common gearbox to move away from the second fixed mount and toward the first fixed mount.

2. The reciprocating blow molding unit of claim 1, wherein the translator screw includes a translator shaft and a plurality of external threads coupled to the translator shaft.

3. The reciprocating blow molding unit of claim 2, wherein the second fixed mount includes a mount frame and a threaded collar coupled to the mount frame and configured to mesh with the plurality of external threads of the translator screw.

4. The reciprocating blow molding unit of claim 1, wherein the first motor is coupled to a first side of the common gearbox and includes a first drive shaft extending toward the first and second gear units and the second motor and the second motor is coupled to an opposite, second side of the common gearbox and includes a second drive shaft extending toward the first and second gear units and the first motor.

5. The reciprocating blow molding unit of claim 4, wherein the first drive shaft and the second drive shaft rotate about a common drive-shaft axis.

6. The reciprocating blow molding unit of claim 1, further comprising a support frame configured to support the extruder screw foundation, the extrusion unit, and the translation unit above ground, the support frame including a plurality of guide rails coupled to the common gearbox to allow sliding movement of the extrusion unit and the translation unit relative to the support frame.

7. The reciprocating blow molding unit of claim 6, wherein the first and second fixed mounts are coupled removably to the plurality of guide rails so that the extruder screw foundation, the extrusion unit, and the translation unit can be repositioned along the plurality of guide rails in unison with one another.

8. The reciprocating blow molding unit of claim 1, wherein the first motor is a first electric motor and the second motor is a second electric motor.

* * * * *